(12) United States Patent
Araki et al.

(10) Patent No.: US 6,423,103 B1
(45) Date of Patent: Jul. 23, 2002

(54) METHOD FOR PRODUCING A SOLID ELECTROLYTIC CAPACITOR

(75) Inventors: Kenji Araki; Yuuji Aoki; Daisuke Takada; Kenichi Takahashi, all of Toyama (JP)

(73) Assignee: NEC Tokin Toyama, Ltd., Toyama (JP)

(*) Notice: Subject to any disclaimer, the term of this patent is extended or adjusted under 35 U.S.C. 154(b) by 0 days.

(21) Appl. No.: 09/492,230

(22) Filed: Jan. 27, 2000

(30) Foreign Application Priority Data

Jan. 25, 1999 (JP) ............................................. 11-015838

(51) Int. Cl.[7] ............................. H01G 9/00; H01G 9/04; H01G 4/228
(52) U.S. Cl. .................... 29/25.03; 29/25.01; 29/25.02; 361/523; 361/531; 361/540
(58) Field of Search ........................... 29/25.01, 25.02, 29/25.03; 361/523, 525, 531, 534, 540

(56) References Cited

U.S. PATENT DOCUMENTS

| | | | |
|---|---|---|---|
| 5,457,862 A | * 10/1995 | Sakata et al. | 29/25.03 |
| 5,461,537 A | * 10/1995 | Kobayashi et al. | 361/525 |
| 5,812,367 A | * 9/1998 | Kudoh et al. | 361/523 |

FOREIGN PATENT DOCUMENTS

| | | |
|---|---|---|
| JP | 1-105523 | 4/1989 |
| JP | 3-155110 | 7/1991 |
| JP | 4-94109 | 3/1992 |
| JP | 5-166681 | 7/1993 |
| JP | 5-175082 | 7/1993 |
| JP | 7-118371 | 5/1995 |
| JP | 7-122461 | 5/1995 |
| JP | 7-201662 | 8/1995 |
| JP | 10-12497 | 1/1998 |
| KR | 1999-001180 | 1/1999 |

* cited by examiner

Primary Examiner—Ha Tran Nguyen
(74) Attorney, Agent, or Firm—Sughrue Mion, PLLC

(57) ABSTRACT

First, an anode lead is led out of an anode member. Next, a dielectric film is formed at a surface of the anode member by anodic oxidation to form a capacitor element. Thereafter, a water-repellent agent is applied on a predetermined position of the anode lead. In succession, the capacitor element is immersed in an oxidant solution of a mixture solvent of alcohol and water, followed by drying. The capacitor element is then immersed in an alcoholic solution of a conductive polymeric monomer to polymerize a conductive polymer electrolyte on a surface of the capacitor element by chemical oxidation.

6 Claims, 2 Drawing Sheets

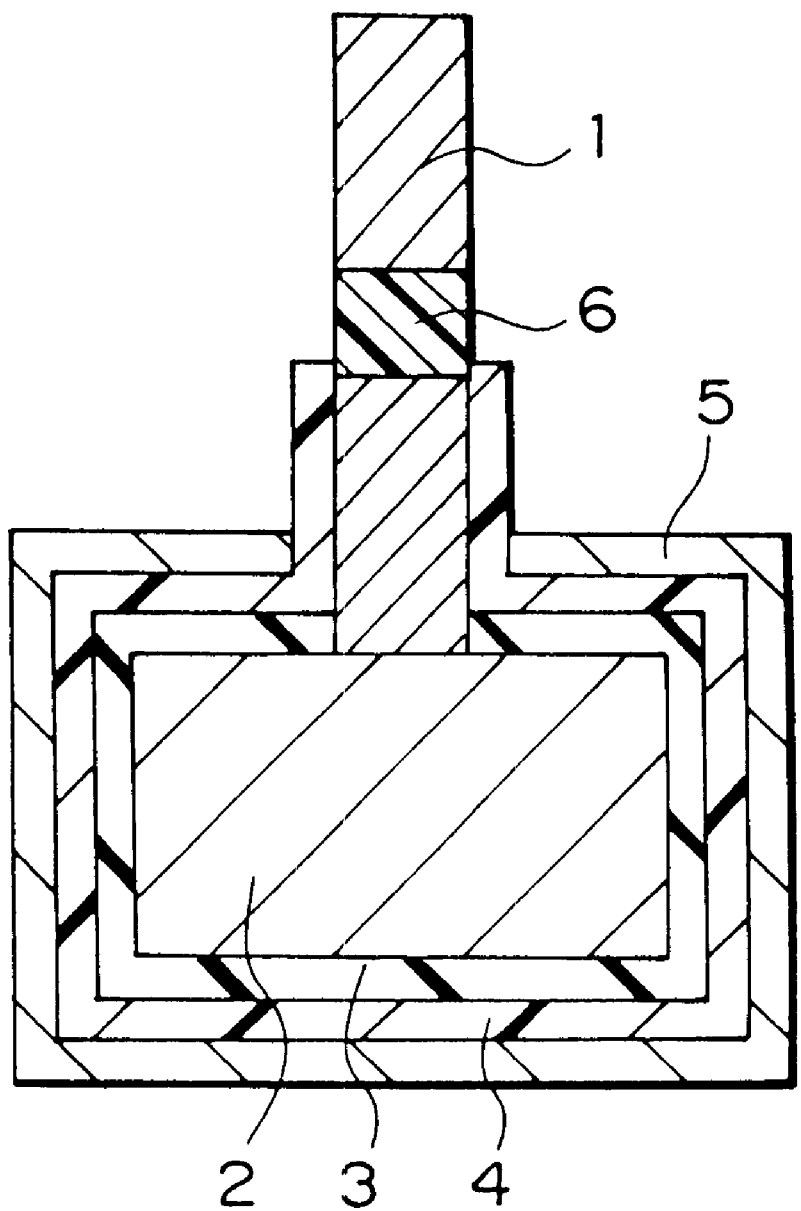

METHOD FOR PRODUCING A SOLID ELECTROLYTIC CAPACITOR

BACKGROUND OF THE INVENTION

1. Field of the Invention

The present invention relates to a method for producing a conductive polymer solid electrolytic capacitor, and, particularly, to a technique for preventing an oxidant from creeping up along an anode wire when an electrolyte is formed by chemically oxidative polymerization and to a method for uniformly forming the film thickness of an electrolytic conductive polymer.

2. Description of the Related Art

There has been an increasing demand for a small-sized and high capacity capacitor which is reduced in impedance in a high frequency range along with a development of light weight and miniaturized electronic equipment. In general, examples of a small-sized and large capacity capacitor are aluminum electrolytic capacitors and tantalum electrolytic capacitors.

The aluminum electrolytic capacitors have a considerable advantage in preparing low cost and large capacity capacitors. However, those capacitors have the drawback of capacitive deterioration due to vaporization of a liquid electrolyte with time because of the use of the liquid electrolyte and the drawback of impaired high frequency characteristics. On the other hand, the tantalum electrolytic capacitors have been improved in the drawback of, for instance, such an impaired capacitive deterioration as is seen in the aluminum electrolytic capacitors by using solid manganese dioxide as the electrolyte.

The solid electrolyte (manganese dioxide) used for the tantalum electrolytic capacitor is formed by making an aqueous manganese nitrate solution impregnated with and adhere to a dielectric oxide film, followed by heat decomposition. This causes the dielectric oxide film, e.g., tantalum oxide film, to be damaged during the heat decomposition and also causes high equivalent series resistance (ESR) at high frequencies.

In order to solve these drawbacks, a proposal has been made on a solid electrolytic capacitor using, as a solid electrolyte, a conductive polymer produced by polymerizing, for example, a complex five-membered ring compound, such as pyrrole, thiophene or furan, which has a higher conductivity than manganese dioxide.

Examples of a method for producing a solid electrolytic layer of the aforementioned conductive polymer are a method of electrolytically polymerizing a monomer and a method of polymerizing a monomer by chemical oxidation. As the electrolytic polymerization method, for instance, a method is well-known in which a mixture solution consisting of a polymerizable monomer and a supporting electrolyte is used and voltage is applied to the mixture solution to polymerize. As the chemically oxidative polymerization method, a method is well-known in which a polymerizable monomer is mixed with an oxidant primarily in a liquid phase. The present invention resides in a method for producing a solid electrolytic capacitor in which method a solid electrolytic layer of a conductive polymer is formed by the latter chemically oxidative polymerization between the two polymerization methods.

Japanese Patent Application Laid-Open (JP-A) No. 3-155110 discloses a method in which a capacitor element which has been finished as far as the formation of a dielectric oxide (e.g., tantalum oxide) film is immersed in an alcoholic solution of an oxidant to allow the oxidant solution to adsorb to the dielectric oxide film and thereafter a monomer solution is applied in the case of forming a solid electrolytic layer of a conductive polymer to produce a solid electrolytic capacitor by using chemically oxidative polymerization.

Also, JP-A No. 7-118371 discloses a technique for polymerizing an electrolyte consisting of aniline and a copolymer compound by a chemical oxidation process in which a tantalum pellet treated by anodic oxidation is immersed in a solution produced by dissolving para-toluene sulfonic acid and an oxidant in a mixture solution of water and ethyl alcohol immediately after it is immersed for a given period of time in a solution produced by dissolving para-toluene sulfonic acid, aniline and pyrrole in a mixture solution of water and ethyl alcohol.

However, when an alcoholic solution of an oxidant is used like in JP-A No. 3-155110, as shown in FIG. 1, an oxidant 22 creeps up along an anode lead 21 led out of a capacitor element 20. Then, as shown in FIG. 2, an electrolyte (cathode side) 23 is formed by polymerization on the anode lead 21, giving rise to the drawback of a development of a short-circuit between the electrolyte 23 and an anode terminal 24 connected to the anode lead 21.

In the technique of JP-A No. 7-118371, in turn, the oxidant creeps up along an anode lead, posing the problem that an electrolyte is formed on the anode lead. There is also the problem that an electrolyte cannot be formed uniformly on the surface of the tantalum pellet treated by anodic oxidation.

JP-A No. 5-166681 discloses a technique for preventing an electrolyte from creeping up along an anode lead by forming a water-repellent masking on a lead portion of the anode lead. JP-A No. 7-201662 discloses a technique for preventing a conductive polymer reaction solution from creeping up along an anode lead by forming a block material using, for instance, a fluororesin or a silicone resin on the lead portion of an anode lead of a capacitor element such that the angle formed by the block material with the surface from which the anode lead is led is designed to be smaller than the contact angle between the conductive polymer-forming reaction solution and the block material.

JP-A No. 5-166681 in which the water-repellent masking is formed on the lead portion of the anode lead has an effect of preventing an electrolyte from creeping up along the anode lead to some extent. This technique, however, has the problem that it can imperfectly prevent an electrolyte from creeping up along the anode lead. While, JP-A No. 7-201662 has an effect of preventing the conductive polymer reaction solution from creeping up along the anode lead by forming a block material into a specific shape and arranging it on the lead portion of the anode lead of the capacitor element. This technique, however, has the problem of an increase in cost for manufacturing the block material.

When 100 wt % water medium is used as the solvent for oxidant, the dispersion of the thickness of the conductive polymer film to be formed is increased, giving rise to the problem of increased dispersion of the ESR characteristics, though the application of the aforementioned repellent agent has an effect of preventing creeping-up.

SUMMARY OF THE INVENTION

It is an object of the present invention to provide a method for producing a solid electrolytic capacitor, the method suppressing the creeping-up of an oxidant, improving the electric characteristics between an electrolyte and an anode terminal and decreasing the dispersion of the ESR characteristics of a capacitor.

According to one aspect of the present invention, a method for producing a conductive polymer solid electrolyte capacitor comprises the steps of: forming an anode lead led out of an anode member; forming a dielectric film at a surface of the anode member by anodic oxidation to form a capacitor element; applying a water-repellent agent to a predetermined position of the anode lead; immersing the capacitor element in an oxidant solution of a mixture solvent of alcohol and water; drying the capacitor element; and immersing the capacitor element in an alcoholic solution of a conductive polymeric monomer to polymerize a conductive polymer electrolyte on a surface of the capacitor element by chemical oxidation.

As to, especially, the mixing ratio of alcohol to water in the oxidant solution used in the present invention, preferably the ratio of water to a solvent is defined in a range between 10 and 80 wt %. This can suppress the creeping-up of the oxidant along the anode lead due to the synergetic effect of the oxidant solution and the water-repellent agent applied to the anode lead. Also, the alcoholic solution of the conductive polymeric monomer is brought into contact with the oxidant fixed to the dielectric film to thereby form a conductive polymer film on the surface of the dielectric film by chemically oxidative polymerization.

BRIEF DESCRIPTION OF THE DRAWINGS

FIG. 3 is a sectional view of a solid electrolytic capacitor for explaining a method for producing a solid electrolytic capacitor according to a first embodiment of the present invention.

DESCRIPTION OF THE PREFERRED EMBODIMENTS

Figure 1:
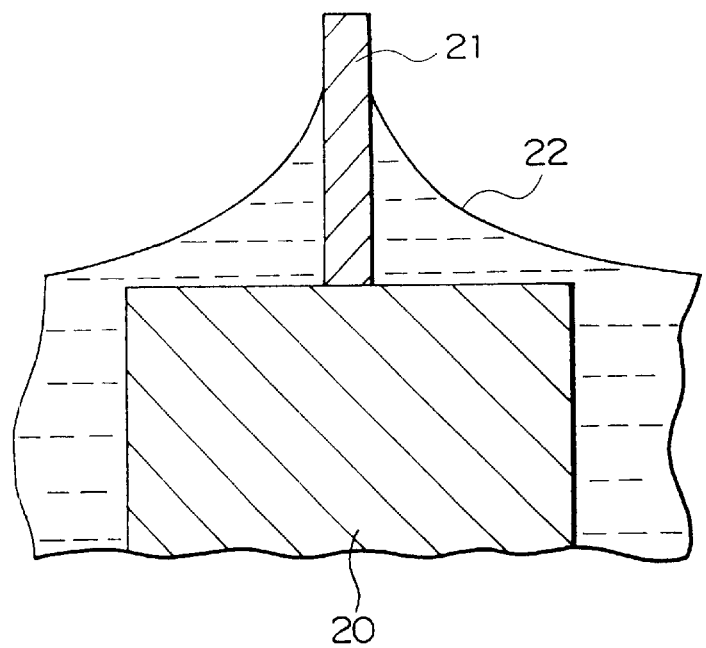
FIG. 1 is a typically sectional view showing a condition of an oxidant creeping up along an anode lead in a conventional method for producing a solid electrolytic capacitor.
Figure 2:
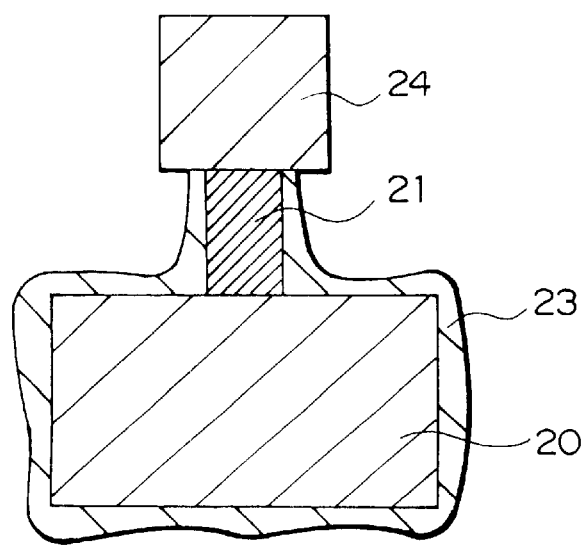
FIG. 2 is a typically sectional view showing an instance of a short circuit formed by a solid electrolyte with an anode terminal in a conventional method for producing a solid electrolytic capacitor.

Preferred embodiments of the present invention will be hereinafter explained in detail with reference to the appended drawings. FIG. 3 is a sectional view of a conductive polymer solid electrolytic capacitor for explaining a method for producing a conductive polymer solid electrolytic capacitor according to a first embodiment of the present invention.

In this embodiment, as shown in FIG. 3, a dielectric oxide film 3 of tantalum oxide ($Ta_2O_5$) is formed on the surface of an anode member 2, which is made of a sintered body of a Ta metal and in which a Ta wire 1 is stood upward. A water-repellent agent 6 is then applied to a predetermined position of the Ta wire 1 and dried for the purpose of preventing creeping-up. As the water-repellent agent 6, for example, a resin agent such as a polypropylene resin, a polyester resin, a silicone resin or a fluororesin may be used.

Next, the anode member 2 is immersed at normal temperature for 5 minutes in an oxidant solution in which 400 g of ferric benzene sulfonate is dissolved in 600 g of a mixture solution of 50 wt % alcohol and 50 wt % water, followed by drying. An appropriate concentration of the oxidant in the oxidant solution is 10 wt % or more. A concentration less than 10 wt % results in reduced oxidizing ability.

Next, the anode member 2 is immersed at normal temperature for 5 minutes in an ethanol solution containing 30 wt % of 3,4-ethylenedioxythiophene (hereinafter called "thiophene solution"), followed by drying.

These immersion treatments in the oxidant solution and in the thiophene solution are repeated alternately, for example, four times to form a poly-thiophene layer 4 as an electrolytic layer.

After the electrolyte layer is formed, a carbon paste and a silver paste are applied to the electrolytic layer and dried to form a cathode layer 5, thereby completing a solid electrolytic capacitor.

In this embodiment, is the ratio of the ethanol solvent to the water solvent in the oxidant solution is important. Therefore, as the ratio is varied, a solid electrolytic capacitor having a solid electrolyte of a conductive polymer is produced using the above producing method to observe the condition of creeping-up of the electrolyte along the Ta wire and to measure the ESR value of the capacitor. Table 1 shows the results. As shown in Table 1, when the proportion of the water solvent in the mixture solution of the water solvent and the ethanol solvent is in a range between 10 and 80 wt %, no creeping-up of the electrolyte along the Ta wire is observed and the ESR value is found to be small. It is also found that in the case of using the oxidant solution of a 100% ethanol solvent, a water-repellent agent exhibits no water-repellency and hence the oxidant creeps up over the water-repellent agent of the Ta wire and an electrolyte is formed on the Ta wire, causing the formation of a short circuit. On the other hand, in the case of using the oxidant solution of a 100% water solvent, it is found that the dispersion of the film thickness of the electrolyte to be formed is greatly increased and the ESR value is increased.

TABLE 1

| Ratio of a water solvent (Wt %) | 0 | 10 | 20 | 30 | 50 |
|---|---|---|---|---|---|
| Dispersion of the film thickness of an electrolyte | 0.83 | 0.72 | 0.80 | 0.82 | 0.88 |
| ESR value (mΩ) | 108 | 105 | 103 | 100 | 95 |
| Percent defective of a short (%) | 100 | 0.0 | 0.0 | 0.0 | 0.0 |
| Generation rate of creeping-up (%) | 100 | 0.0 | 0.0 | 0.0 | 0.0 |

TABLE 2

| Ratio of a water solvent (Wt %) | 70 | 80 | 90 | 100 |
|---|---|---|---|---|
| Dispersion of the film thickness of an electrolyte | 1.55 | 1.80 | 2.31 | 16.7 |
| ESR value (mΩ) | 95 | 102 | 115 | 163 |
| Percent defective of a short (%) | 0.0 | 0.0 | 0.0 | 0.0 |
| Generation rate of creeping-up (%) | 0.0 | 0.0 | 0.0 | 0.0 |

In the above embodiment, although ethanol is used as the alcoholic solvent of the oxidant solution, the same effect is obtained if methanol or isopropyl alcohol other than ethanol is used.

Next, a method for producing a conductive polymer solid capacitor according to a second embodiment of the present invention will be explained. In this embodiment, ferric toluene sulfonate is used as the oxidant in place of ferric benzene sulfonate used in the first embodiment.

In the second embodiment, like in the first embodiment, a dielectric oxide film of tantalum oxide ($Ta_2O_5$) is formed by anodic oxidation on the surface of an anode member which is made of a sintered body of a Ta metal and in which a Ta wire is stood upward. A water-repellent agent is then applied to a predetermined position of the Ta wire and thereafter dried for the purpose of preventing creeping-up.

Next, the anode member 2 is immersed at normal temperature for 5 minutes in an oxidant solution (40 wt % of ferric toluene sulfonate, 30 wt % of alcohol and 30 wt % of water) in which an oxidant consisting of a water solvent and 40 wt % of ferric toluene sulfonate and an oxidant consisting of an alcoholic solvent (using ethanol) and 40 wt % of ferric toluene sulfonate are mixed in a ratio by weight of 1:1, followed by drying.

Next, the anode member 2 is immersed at normal temperature for 5 minutes in an ethanol solution containing 30 wt % of 3,4-ethylenedioxythiophene, followed by drying. These immersion treatments in the oxidant solution and in the thiophene solution are repeated alternately, for example, four times to form a polythiophene layer as an electrolytic layer.

In the second embodiment, no creeping-up of the electrolyte along the Ta wire is observed and the ESR value of the conductive polymer solid capacitor is found to be small like in the first embodiment.

In these embodiments, although ferric benzene sulfonate or ferric toluene sulfonate is used as the oxidant, ferric naphthalene sulfonate may be used. Also, as the conductive polymeric monomer, not only thiophene but also derivative of thiophene, and pyrrole, furan, and aniline and its derivatives may be used.

In the present invention, as stated above in detail, an oxidant of a mixture solvent consisting of water and alcohol is used and hence the creeping-up of the oxidant along an anode lead (Ta wire) can be suppressed due to the synergetic effect of the oxidant and a water-repellent agent applied to the anode lead. Also, after an oxidant is fixed to a dielectric film, the oxidant is brought into contact with an alcoholic solution of a conductive polymeric monomer and hence electric insulation between an electrolyte (cathode) and an anode terminal can be improved. Moreover, the formation of an electrolyte into a dielectric film is promoted to thereby decrease the dispersion of the ESR characteristics of the capacitor.

What is claimed is:

1. A method for producing a solid electrolyte capacitor comprising the sequential steps of:
    forming an anode lead led out of an anode member;
    forming a dielectric film at a surface of said anode member by anodic oxidation to form a capacitor element;
    applying a water-repellent agent to a predetermined position of said anode lead;
    immersing said capacitor element in an oxidant solution of a mixture solvent of alcohol and water;
    drying said capacitor element; and
    immersing said capacitor element in an alcoholic solution of a conductive polymeric monomer to polymerize a conductive polymer electrolyte on a surface of said capacitor element by chemical oxidation,
    wherein the ratio of water to the mixture solvent of alcohol and water in said oxidant solution is 10 to 80 wt %.

2. The method for producing a solid electrolyte capacitor according to claim 1, wherein said oxidant contained in said oxidant solution is one type selected from a group consisting of ferric benzene sulfonate, ferric toluene sulfonate and ferric naphthalene sulfonate.

3. The method for producing a solid electrolyte capacitor according to claim 1, wherein said alcohol contained in said oxidant solution is one type selected from a group consisting of methyl alcohol, ethyl alcohol and isopropyl alcohol.

4. The method of producing a solid electrolyte capacitor according to claim 1, wherein said water-repellent agent is one water-repellent material selected from a group consisting of a polypropylene resin, a polyester resin, a silicone resin and a fluororesin.

5. The method for producing a solid electrolyte capacitor according to claim 1, wherein said conductive polymeric monomer is one type selected from a group consisting of aniline, pyrrole and thiophene.

6. The method for producing a solid electrolyte capacitor according to claim 1, wherein said conductive polymeric monomer is a derivative of one monomer selected from a group consisting of aniline, pyrrole and thiophene.

* * * * *